United States Patent
Gonzalez et al.

(10) Patent No.: US 6,866,775 B1
(45) Date of Patent: Mar. 15, 2005

(54) APPARATUS FOR TREATING METAL-WORKING FLUID

(76) Inventors: Anthony H. Gonzalez, ALG Life Sciences 633 Poltava St., Springfield, OR (US) 97477; Michael D. Birran, ALG Life Sciences 633 Poltava St., Springfield, OR (US) 97477; Michel Jammal, ALG Life Sciences 633 Poltava St., Spriingfield, OR (US) 97477

( * ) Notice: Subject to any disclaimer, the term of this patent is extended or adjusted under 35 U.S.C. 154(b) by 0 days.

(21) Appl. No.: 10/773,739

(22) Filed: Feb. 6, 2004

Related U.S. Application Data

(62) Division of application No. 09/812,480, filed on Mar. 19, 2001, now Pat. No. 6,712,975.
(60) Provisional application No. 60/190,761, filed on Mar. 20, 2000.

(51) Int. Cl.[7] .............................................. B01D 15/04
(52) U.S. Cl. ..................... 210/178; 210/180; 210/182; 210/195.1; 210/202; 210/218; 210/219; 210/221.2; 210/257.1; 210/259; 210/266
(58) Field of Search ................................ 210/178, 179, 210/180, 182, 195.1, 202, 209, 218, 219, 221.2, 257.1, 259, 266

(56) References Cited

U.S. PATENT DOCUMENTS

| | | | |
|---|---|---|---|
| 1,952,281 A | 3/1934 | Ranque | 62/5 |
| 3,173,273 A | 3/1965 | Fulton | 62/5 |
| 3,208,229 A | 9/1965 | Fulton | 62/5 |
| 4,046,492 A | 9/1977 | Inglis | 417/197 |
| 4,240,261 A | 12/1980 | Inglis | 62/5 |
| 4,339,926 A | 7/1982 | Moretti et al. | 62/5 |
| 4,492,636 A | 1/1985 | Burke | 210/706 |
| 4,518,847 A | 5/1985 | Horst et al. | 392/358 |
| 4,636,317 A | 1/1987 | Lewis | 210/748 |
| 4,798,669 A | 1/1989 | Bachhofer et al. | 210/109 |
| 4,865,724 A | * 9/1989 | Brandt et al. | 210/104 |
| 4,871,450 A | * 10/1989 | Goodrich et al. | 210/151 |
| 4,871,779 A | 10/1989 | Killat et al. | 521/28 |
| 5,447,642 A | 9/1995 | Schenach | 210/774 |
| 5,545,798 A | 8/1996 | Elliott | 588/18 |
| 5,942,128 A | 8/1999 | Fortier | 210/776 |
| 5,948,244 A | * 9/1999 | Fortier | 210/167 |

OTHER PUBLICATIONS

E. C. Hill, "Microbial aspects of health hazards from water based metal working fluids", Tribiology International vol. 16 No. 3 p. 138 (1983).
Metals Handbook 9ed. vol. 16 Machining "Recycling and fluid cleaning" p129.

* cited by examiner

*Primary Examiner*—Ivars C. Cintins
(74) *Attorney, Agent, or Firm*—David S. Alavi

(57) ABSTRACT

An apparatus for treating metal-working fluid comprises: a heating vessel for receiving and holding metal-working fluid for treatment; a heater for heating the metal-working fluid in the heating vessel; an agitator for agitating the metal-working fluid within the heating vessel; an aerator for aerating the metal-working fluid within the heating vessel; and a holding vessel for receiving from the heating vessel and holding treated metal-working fluid. During heating, heated ambient air may be drawn through air inlets and through the fluid agitate and aerate the fluid, thereby ensuring uniform heating and extracting gaseous contaminants. Mist and/or gaseous contaminants may be removed from the airflow prior to its release into the environment. Concentration in the metal-working fluid of at least one metal may be reduced using an using-exchange filter.

6 Claims, 8 Drawing Sheets

APPARATUS FOR TREATING METAL-WORKING FLUID

RELATED APPLICATIONS

This application is a divisional application of prior-filed App. No. 09/812,480 entitled "Methods and apparatus for treating metal-working fluid" filed Mar. 19, 2001 in the names of Anthony H. Gonzalez, Michael Birran, and Michel Jammal, now U.S. Pat. No. 6,712,975, with in turn claims benefit of provisional App. No. 60/190,761 entitled "Methods and apparatus for treating metal-working fluid" filed Mar. 20, 2000 in the names of Anthony H. Gonzalez, Michael Birran, and Michel Jammal. Both of said applications are hereby incorporated by reference as if fully set forth herein.

BACKGROUND

The field of the present invention relates to handling of metal-working fluid. In particular, methods and apparatus are described herein for treating metal-working fluid for re-use.

Currently-used aqueous metal-working fluid formulations contain agents such as biocides, extreme pressure additives, antioxidants, corrosion inhibitors, dyes, water conditioners, and so forth. These agents may comprise formaldehyde, ethanolamines, chlorinated compounds, detergents, nitrites, nitrates, phosphates, borates, and other organic and/or inorganic compounds. Furthermore, aqueous metal-working fluids are prone to microbial contamination and for this reason often contain biocides. Recognized diseases associated with metal-working fluid include contact dermatitis, work-related asthma, and hypersensitivity pneumonitis. It is evident that many metal-working fluid agents as well as microbial contaminants are harmful to metal workers and the environment.

Long term debilitating conditions due to contact with contaminated metal-working fluid and increased burden on the environment demand effective management methods. However, management of metal-working fluid is technically difficult and expensive. Machining operations employ elaborate enclosures to control the dispersal of metal-working fluid mists. Contaminated metal-working fluid must be evaporated and/or transported to dump sites by certified agents. Management of contaminated metal-working fluid by disposal results in its accumulation in landfills and dump sites. More importantly, worker health issues cannot be ignored. There are over two million metal workers in the United States alone, and the industry is growing and with that growth arises the potential to expose even more workers to metal-working fluid exposure hazards.

Tool grinders and saw fillers using carbide or stellite tipped tools may develop asthma or hard metal lung disease. These health-debilitating conditions are currently viewed as a result of exposure to cobalt, although other transition and/or heavy metals may also be implicated. Two principal features of hard metal lung disease are inflamed and scarred alveolar tissue. Treatment of these conditions includes medication and perhaps removal from the work place. However, not all patients may respond to treatment. There are other diseases reported to be associated with cobalt exposure. Some of the reported diseases are contact dermatitis, eczema, cardiomyopathy and lung cancer. Whether these medical conditions arise through exposure to metal particulates or exposure to aqueous solutions containing metal ions (liquid or mist) has not been elucidated.

Biocides have been used for years in an attempt to control microbial contamination in metal-working fluid as well as other fluids. The addition of such biocides represents an added expense, and is also difficult to control. Some studies show that they are effective for only a brief period of time and never completely inhibit bacteria and other microbes. Furthermore, biocides may induce selection in mycobacteria, recently associated with hypersensitivity pneumonitis, and other microbes, thereby producing resistant strains of these micro-organisms. Byproducts of microbial contamination may also pose health risks to and/or create an unpleasant work environment for metal workers. In particular, significant microbial contamination is often also accompanied by production of hydrogen sulfide, a malodorous and potentially harmful contaminant.

The Safe Drinking Water Act requires disinfection of all public water supplies. It further requires the Environmental Protection Agency (EPA) to set standards and establish processes for the treatment and distribution of disinfected water. The Act ensures that no significant risks to human health arise from public water supplies. Disinfectants and filtration systems are currently acceptable methods for treating water supplies. However, EPA has evidence linking disinfectant byproducts to cancers and other toxic effects.

EPA actively seeks innovative technology to upgrade existing methods. These new technologies may include alternatives to chlorine, innovative applications of UV irradiation, and other processes that improve methods of treating public water supplies. The agency's goals are to develop new methods that remove organic and inorganic compounds as well as particulate matter and pathogens. The organic and inorganic compounds of particular interest may include perchlorates, aluminum, pesticides, arsenic, nitrates, and radium. Pathogens of particular interest may include cryptosporidium, caliciviruses, microsporidia, echoviruses, and adenoviruses.

It is therefore desirable to provide apparatus and methods for treating metal-working fluid that addresses the problems associated with contaminated metal-working fluid, exposure thereto, and disposal thereof.

SUMMARY

Certain aspects of the present invention may overcome one or more aforementioned drawbacks of the previous art and/or advance the state-of-the-art of treatment of metal-working fluid, and in addition may meet one or more of the following objects:

To provide apparatus and methods for treating metal-working fluid whereby the useful life of the metal-working fluid is extended;

To provide apparatus and methods for treating metal-working fluid wherein the likelihood of metal-working fluid exposure-related illness in metal workers is reduced;

To provide apparatus and methods for treating metal-working fluid wherein particulates are filtered from the metal-working fluid;

To provide apparatus and methods for treating metal-working fluid wherein microbial contamination may be suppressed and/or eliminated without using biocides;

To provide apparatus and methods for treating metal-working fluid wherein microbial contamination may be suppressed and/or eliminated by heating the metal-working fluid;

To provide apparatus and methods for treating metal-working fluid wherein the metal-working fluid is agitated and/or aerated during treatment;

To provide apparatus and methods for treating metal-working fluid wherein gaseous and/or malodorous contaminants are removed by aeration and/or filtration;

To provide apparatus and methods for treating metal-working fluid wherein concentrations of cobalt and/or other metal ions are reduced by treatment of the metal-working fluid;

To provide apparatus and methods for treating metal-working fluid wherein concentrations of cobalt and/or other metal ions are reduced by passing the metal-working fluid through an ion-exchange medium;

To provide apparatus and methods for treating metal-working fluid wherein metal-working machine down time due to metal-working fluid treatment is reduced or substantially eliminated; and To provide apparatus and methods for treating metal-working fluid that may be readily and/or economically implemented in a typical metal-working work environment.

One or more of the foregoing objects may be achieved in the present invention by a method for treating metal-working fluid comprising the steps of: a) transferring the metal-working fluid into a heating vessel; b) heating the metal-working fluid in the heating vessel to maintain the metal-working fluid at an elevated temperature during a heating period; c) agitating and aerating the metal-working fluid during the heating period; d) transferring the metal-working fluid out of the heating vessel into a holding vessel after the heating period; and e) transferring the metal-working fluid out of the holding vessel. The fluid may pass through a particle filter before entering the heating vessel, and it may be heated to between about 145° F. and about 210° F. for at least about 30 minutes while in the heating vessel. During heating, heated ambient air may be drawn through air inlets and through the metal-working fluid to agitate and aerate the metal-working fluid, thereby ensuring substantially uniform heating and extracting gaseous contaminants. Mist and gaseous contaminants are substantially removed from the airflow prior to its release into the surroundings. After the heating period the treated metal-working fluid is transferred into a holding vessel and ultimately back to a metal-working machine for re-use. The metal-working fluid may flow through an ion-exchange medium to reduce concentrations of cobalt and/or other metal ions before transfer of the fluid back to a metal-working machine.

One or more of the foregoing objects may be achieved in the present invention by an apparatus for treating metal-working fluid, the apparatus comprising: a) a heating vessel; b) a heater for heating the metal-working fluid in the heating vessel to an elevated temperature to maintain the metal-working fluid at the elevated temperature during a heating period; c) an agitator for agitating the metal-working fluid during the heating period; d) an aerator for aerating the metal-working fluid during the heating period; e) a holding vessel; and f) a pump for transferring the metal-working fluid from the heating vessel into the holding vessel after the heating period. The apparatus may further include a particulate filter through which the metal-working fluid may flow before and/or during transfer into the heating vessel, and an ion-exchange medium through which the metal-working fluid may flow before and/or during transfer back to a metal-working machine.

Additional objects and advantages of the present invention may become apparent upon referring to the preferred and alternative embodiments of the present invention as illustrated in the drawings and described in the following written description and/or claims.

In the Figures, fluid/liquid flow is designated by solid arrows, while air/gas flow is designated by open arrows. A bow-tie-shaped valve symbol with a transverse line segment is closed, while a valve symbol without a transverse line segment is open.

DETAILED DESCRIPTION OF PREFERRED AND ALTERNATIVE EMBODIMENTS

FIGS. 1 through 6 illustrate schematically methods and apparatus for treating metal-working fluid according to the present invention. The apparatus comprises a heating vessel 100, a holding vessel 200, a heater for heating the metal-working fluid in heating vessel 100, and agitator for agitating the metal-working fluid in heating vessel 100, an aerator for aerating the metal-working fluid in heating vessel 100, and a pump for transferring the metal-working fluid out of the heating vessel 100 and into the holding vessel 200. For purposes of the present written description and claims, the term "pump" shall broadly designate any device used to induce a flow of material (fluid, liquid, air, gas, and so forth) through generation of a pressure differential/gradient between a flow source and a flow destination. Heating vessel 100 and holding vessel 200 may be fabricated from any material compatible with the metal-working fluid to be treated and able to tolerate the elevated temperatures needed for treatment of the metal-working fluid, including but not limited to metals, plastics, other polymeric resins, and the like. A preferred material for heating vessel 100 and holding vessel 200 is stainless steel. In a typical machine shop environment volumes of about 5 gallons to about 50 gallons of metal-working fluid may require treatment, and the heating and holding vessels may be suitably large to accommodate these volumes, although the vessels may be sized to treat any desired volume of metal-working fluid.

Figure 1:
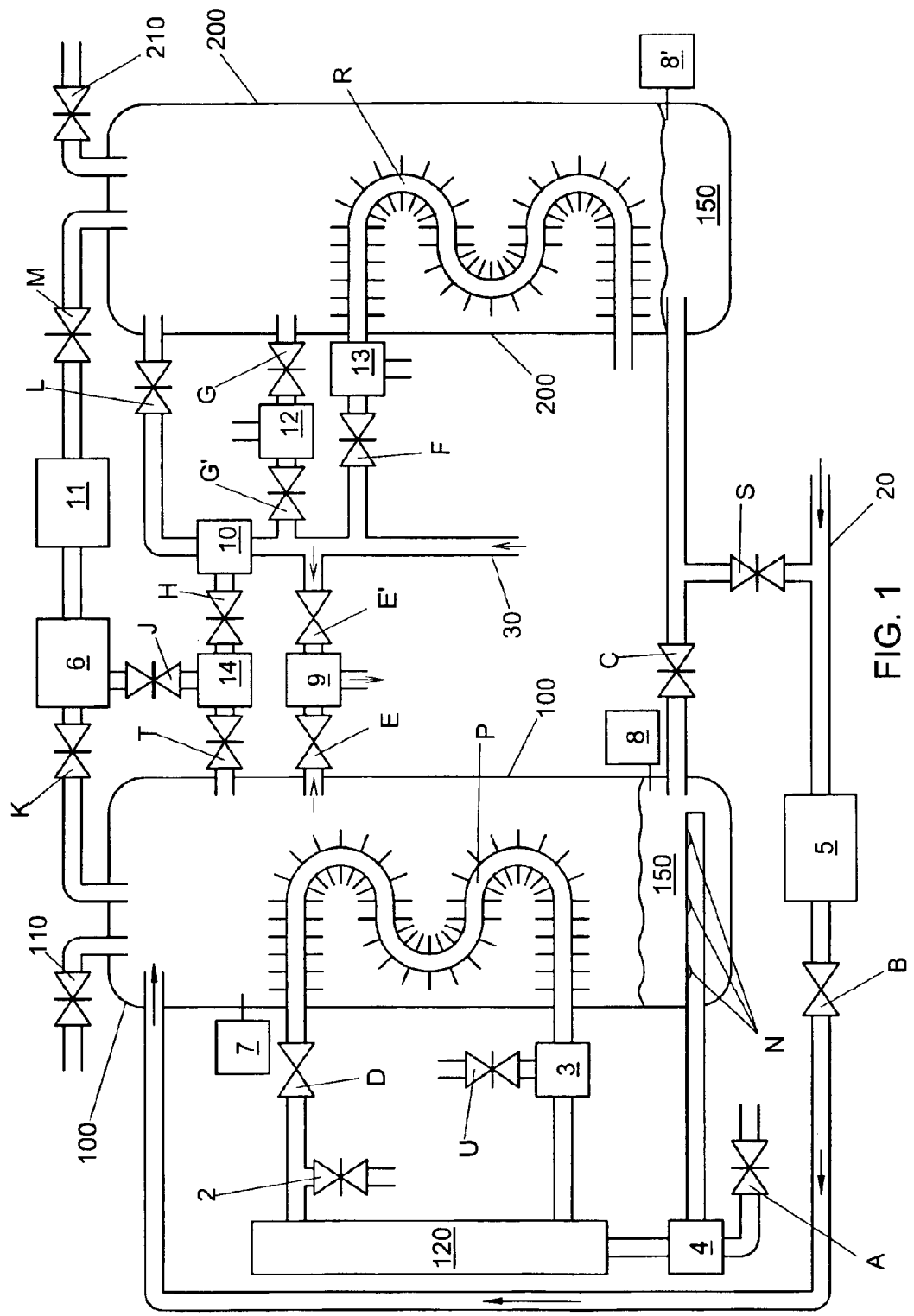
FIG. 1 schematically illustrates methods and apparatus for treating metal-working fluid according to the present invention.

Used metal-working fluid in need of treatment according to the present invention preferably may be drawn into heating vessel 100 (as shown in FIG. 1) by opening valves B, E, and E', while closing valves C, K, and T. Open valve E' provides shop compressed air from compressed air supply line 30 to drive air flow amplifier 9, thereby applying negative air pressure (between about 1 psi and about 7 psi, preferably about 3 psi, below ambient atmospheric pressure) to heating vessel 100 through open valve E and drawing the metal-working fluid from a sump or reservoir of a metal-working machine through transfer line 20, through filter 5 and open valve B, and into heating vessel 100. Filter 5 may be any suitable filter for removing particulates and debris from the metal-working fluid prior to treatment. A bag filter (polymeric mesh/weave, 10–250 μm particle size) may be preferred, but a variety of suitable filters may be employed without departing from inventive concepts disclosed and/or claimed herein, including but not limited to bag filters, rope/string filters, mesh or screen filters (metal, plastic, polymeric, fiber, or other, paper filters, and the like). The filtered metal-working fluid is drawn in heating vessel 100 until the transfer is stopped manually or until full, which may be indicated by an upper fluid level limit switch 7 or other suitable fluid level sensor. Alternatively, air flow amplifier 9 may be provided with a safety valve for preventing entry of metal-working fluid thereinto, thereby stopping inflow of metal-working fluid into heating vessel 100 when the level of air flow amplifier 9 is reached. After transfer of the metal-working fluid 150 into heating vessel 100, valves B, E, and E' are closed.

Air flow amplifier 9 may comprise a compressed-air-driven device as disclosed in U.S. Pat. No. 4,046,492, said patent being hereby incorporated by reference as if fully set forth herein. Use of such a source for applying negative air pressure to heating vessel 100 is particularly well-suited to the present invention. A typical use environment for the present invention is a machine shop where compressed air is often readily available. Without departing from inventive concepts disclosed and/or claimed herein, any other source of negative pressure, suction, and/or vacuum may be equivalently employed (in place of air flow amplifier 9 and/or any other air flow amplifier disclosed herein). Without departing from inventive concepts disclosed and/or claimed herein, any of a variety of alternative methods may be employed for transferring metal-working fluid into heating vessel 100, including but not limited to: drawing fluid into the heating vessel by applying negative air pressure to the heating vessel; driving fluid into the heating vessel by applying positive air pressure to the fluid; using a fluid pump to transfer the fluid; siphoning the fluid into the heating vessel; collecting and transferring the fluid in a transfer vessel (i.e., a bucket) and pouring it into the heating vessel; combinations thereof; functional equivalents thereof. Heating vessel 100 may be provided with safety pressure relief valve 110 for venting excessive air and/or fluid pressure within heating vessel 100. Relief valve 110 may be set to open at about 5 psi to about 15 psi above ambient atmospheric pressure. A plurality of safety valves covering a range of opening pressures may be employed to add a degree of redundancy in case of safety valve failure.

Figure 2:
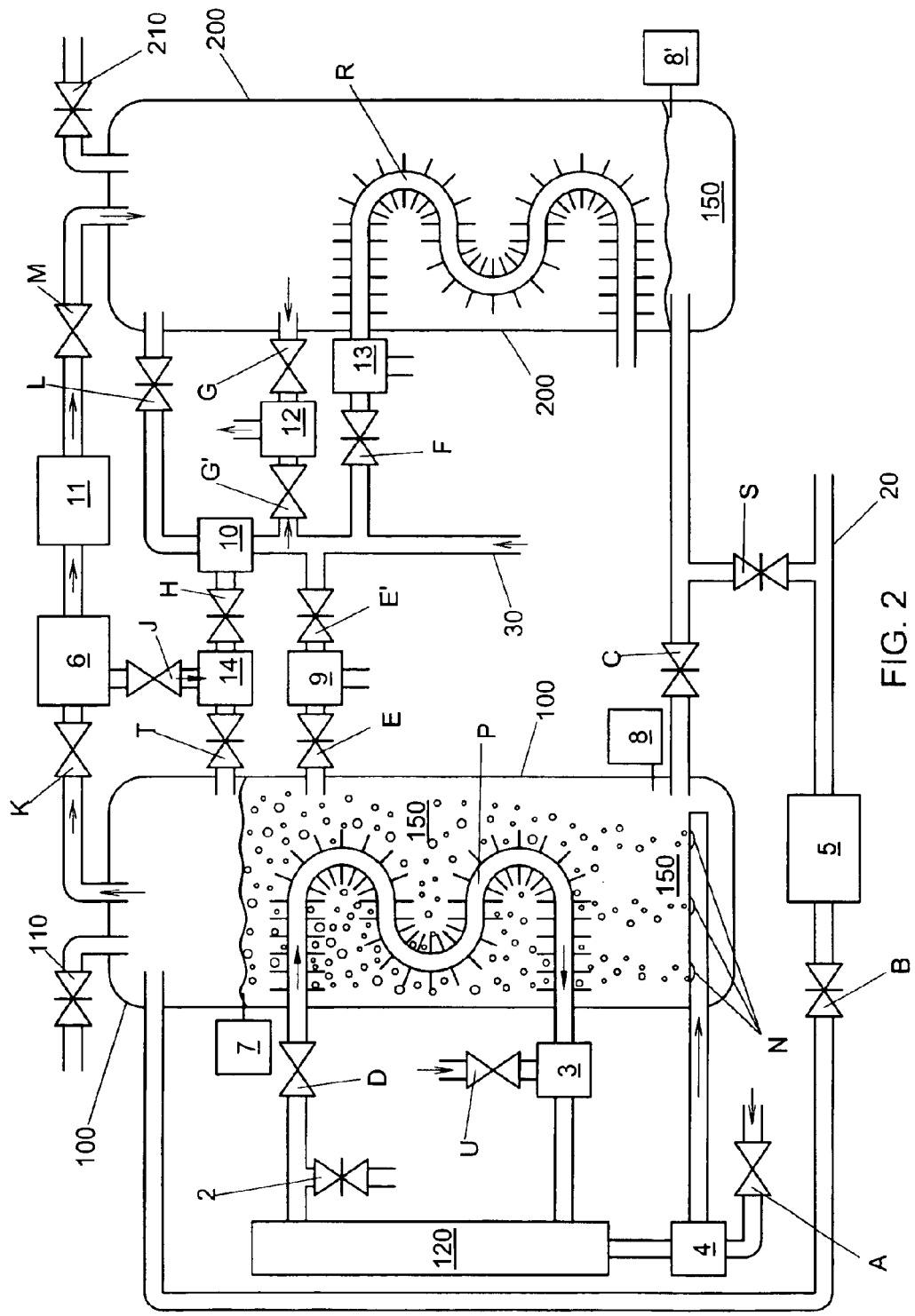
FIG. 2 schematically illustrates methods and apparatus for treating metal-working fluid according to the present invention.

Once the metal-working fluid 150 has been transferred into heating vessel 100, the heating cycle may begin (FIG. 2). Valves A, D, G, G', K, J, M, and U are opened, while valves B, C, E, E', and T are closed. Centrifuge impactor 6 is activated, as is a recirculating heater 120 for circulating heating fluid through heat exchanger P within heating vessel 100. Valve D may be provided for servicing the heater and/or heat exchanger, is typically manually operated, and is typically left in an open position. Safety valve 2 may provided to prevent over-pressuring of the recirculation system for the heater. Pump 3 drives recirculation of heating fluid through heater 120 and heat exchanger P and may preferably comprise a seal-less chemical pump driven by shop compressed air via open valve U, although any suitable fluid pump may be employed. Heat exchanger P typically comprises one or more finned heating tubes positioned within heating vessel 100. The fins may comprise a series of transverse disks or plates connected to and extending radially outward from the tube, thereby increasing the surface area of contact between the heat exchanger P and the metal-working fluid to be heated. The tube may be substantially vertically oriented within heating vessel and may be provided with one or more coils and/or S-turns, and the recirculating heating fluid may preferably flow from the top of heating vessel 100 to the bottom. Any other suitable geometry for the heat exchanger (including tube and fins) may be equivalently employed without departing from inventive concepts disclosed and/or claimed herein. The tube and fins are preferably fabricated from suitably thermally conductive material, preferably metal, most preferably copper, stainless steel, and/or aluminum. The recirculating heating fluid may comprise water, ethylene glycol, a suitable water/ethylene glycol mixture, any of a variety of oils or other organic fluids (alcohols, glycols, hydrocarbons, and so forth), steam, air, inert gases, other gases, combinations thereof, and/or functional equivalents thereof. Without departing from inventive concepts disclosed and/or claimed herein, any suitable means may be employed for heating metal-working fluid in the heating vessel 100. These may include but are not limited to: the recirculating heater and heating exchanger as described hereinabove; a recirculating heater for heating the walls of heating vessel 100; resistive electrical heating elements within heating vessel 100 and/or on the walls of heating vessel 100; flame and/or forced air heating of the exterior of heating vessel 100; steam injection directly into the metal-working fluid; combinations thereof; and/or functional equivalents thereof. Heating vessel 100 may be provided with insulation to improve the efficiency of the heating process.

The metal-working fluid 150 is heated in heating vessel 100 to an elevated temperature and maintained at about that temperature during a heating period (defined as the time period during which the metal-working fluid is maintained at about the desired elevated temperature, but not including time required to reach the elevated temperature). Most metal-working fluid formulations (with the exception of straight oils) may typically contain 105–106 microbial colony-forming units (CFUs) per milliliter, and used metal-working fluid may contain upwards of 108–109 CFU/ml. Biocides may reduce microbe levels to about 104 CFU/ml. It has been observed that treating used metal-working fluid according to the present invention by heating the metal-working fluid to a preferred elevated temperature of about 160° F. for a preferred heating period of about one hour reduces microbe levels to less than about 102 CFUs. If less complete killing of microbes is tolerable, the elevated temperature may be reduced to about 145° F., and the heating period may be a short as about 30 minutes. Still lower elevated temperatures and/or shorter heating periods may be suitable depending on the particular situation. Longer heating periods and/or higher elevated temperatures may be required for more complete killing of micro-organisms, or for killing of more hardy/resistant forms of micro-organisms. In any case, the elevated temperature should preferably be kept below the boiling point of the metal-working fluid (less than about 210° F.) and below a cracking temperature of any components of the metal-working fluid. Multiple heating periods, with intervening non-heated periods, may be employed for enhanced killing/suppressing of spore-forming microbes.

Figure 7:
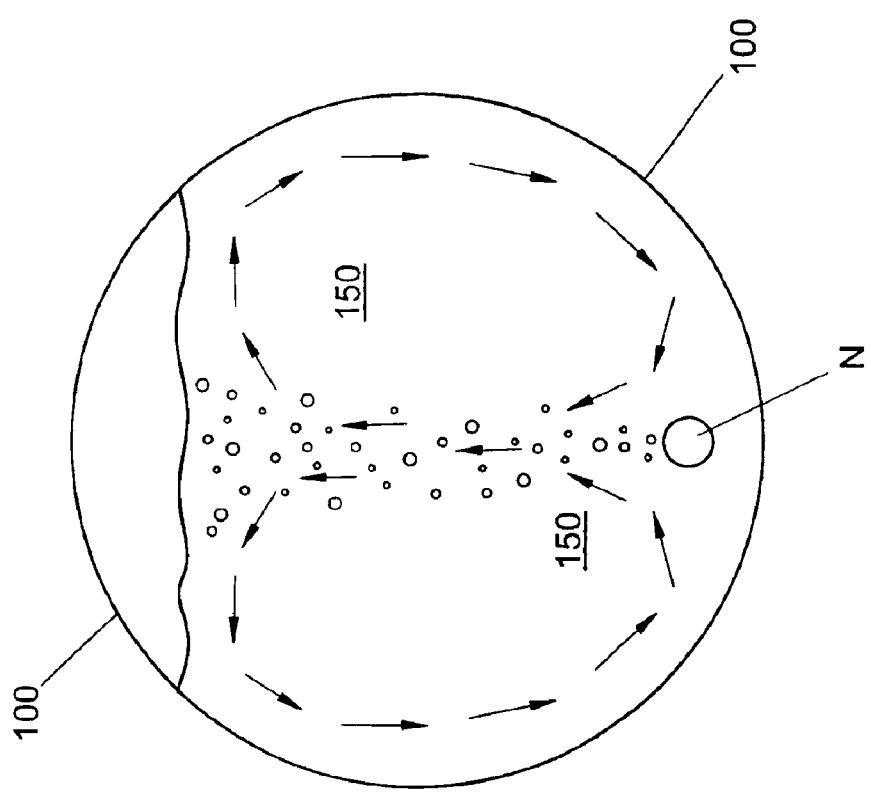
FIG. 7 shows a cross-section of a heating vessel and aerator/agitator according to the present invention.

It is desirable to agitate and aerate the metal-working fluid 150 during treatment. Aeration is desirable for killing and/or suppressing anaerobic microorganisms in the metal-working fluid, and is helpful for removing hydrogen sulfide and other gaseous (and possibly malodorous and/or toxic) contaminants from the metal-working fluid. Agitation is desirable to insure substantially uniform heating of the entire volume of the metal-working fluid, and to mechanically break up so-called "biofilms" and/or other microscopic and/or macroscopic aggregations of micro-organisms. Both aeration and agitation of the metal-working fluid during the heating period may be preferably implemented in the present invention by bubbling heated ambient air through the metal-working fluid as it is heated. The bottom of the heating vessel 100 is provided with a plurality of air inlets N, though which ambient air enters through open valve A and heating coils 4. Heating coils 4 may be heated by heater 120 (also used to heat the metal-working fluid preferably via recirculating heating fluid) or may be provided with an independent, dedicated heating element of any suitable type. Preheating the incoming air flow in this way reduces any cooling of the metal-working fluid by the incoming air flow as the metal-working fluid is being heated. As shown in the cross-section of FIG. 7, the air inlets are preferably arranged roughly along a line near the center of heating tank 100. The upward flow of air bubbles from inlets N as air flows through the metal-working fluid 150 causes the fluid to flow upward above the inlets. A counter-balancing downward fluid flow develops near the two sides of the heating vessel. These two counter-rotating flows, or eddies, serve to agitate the metal-working fluid as it is being heated, thereby insuring substantially uniform heating of the metal-working fluid. These eddies also serve to mechanically break up microscopic and macroscopic aggregates of micro-organisms, thereby facilitating killing and/or suppressing them. Heating vessel 100 may preferably comprise a substantially cylindrical vessel with a substantially horizontal axis and with air inlets N arranged roughly along a line at the bottom of the vessel and roughly parallel to the axis of the cylinder. Other suitable vessel geometries and/or inlet positions may be equivalently employed without departing from inventive concepts disclosed and/or claimed herein. The geometry and fins of heat exchanger P may also serve to break up aggregates and/or biofilms as the metal-working fluid and air flow around and/or through them. In an alternative embodiment of the present invention and without departing from inventive concepts disclosed and/or claimed herein, any suitable means may be employed for agitating the metal-working fluid during the heating period, including but not limited to: bubbling air or other gas through the metal-working fluid, mechanically stirring the metal-working fluid, shaking the heating vessel, sonication, and so forth. It should be noted that while in a preferred embodiment of the present invention aeration and agitation are provided by the same components and/or method steps, separate components and/or methods steps may be equivalently employed to implement agitation and aeration while remaining within the scope of inventive concepts disclosed and/or claimed herein.

Negative pressure (between about 1 psi and about 7 psi, preferably about 3 psi, relative to the ambient atmospheric pressure) may be applied to the air volume above the metal-working fluid in heating vessel 100 through open valve K to draw ambient air though inlets N and through the metal-working fluid. The air flow through the heated metal-working fluid serves to aerate the metal-working fluid, thus killing and/or suppressing anaerobic microbes in the metal-working fluid. The air flow also serves to extract hydrogen sulfide and/or other undesirable dissolved gaseous contaminants from the metal-working fluid, and these contaminants flow out of heating vessel 100 through valve K with the air flow. The negative pressure applied to the air volume above the metal-working fluid may serve to reduce and/or substantially eliminate foaming of the metal-working fluid as the air flow bubbles through it, since the bubbles will tend to burst at the surface due to the reduced pressure.

The air flow leaving the heating vessel is typically laden with droplets and/or mist, which is preferably removed by a de-mister comprising centrifuge impactor 6. Impactor 6 may typically comprise a drum-like housing enclosing a rotary member having a plurality of radially-projecting vanes thereon. The rotary member is spun at a relatively high angular velocity so that the linear velocity of the vanes is on the order of a hundred feet/sec or more. Droplets or mist that impact these vanes condense thereon, and are then spun off to the inner surface of the housing where the resulting liquid is collected for return to heating vessel 100. In an alternative embodiments of the present invention and without departing from inventive concepts disclosed and/or claimed herein, any suitable means may-be equivalently employed for removing mist and/or droplets from the airflow, including but not limited to filters, scrubbers, condensers, and so forth. The de-misted air flow preferably flows through a filter 11 for removal of hydrogen sulfide and/or other gaseous contaminants. Filter 11 may preferably comprise an activated charcoal filter, although any suitable filter or combination of filters may be employed (depending on the gaseous contaminants to be removed from the air flow) without departing from inventive concepts disclosed and/or claimed herein. Examples may include but are not limited to: paper and/or fiber filters, activated charcoal, zeolites, catalytic filters, resins, exchange columns, chromatographic columns, impregnated and/or treated filters, and so forth. As shown in FIG. 2, the air flow passing through filter 11 is drawn through open valve M, holding vessel 200, and open valve G, and vented to the surroundings by air flow amplifier 12, driven by shop compressed air through open valve G'. The de-misted and filtered airflow may equivalently be vented directly from filter 11 into the surroundings. The negative pressure generated by air flow amplifier 12 serves to pull the air flow through filter 11, and may also provide the negative pressure applied to the air volume above the metal-working fluid in the heating vessel 100. Centrifuge impactor 6 may also be configured (by suitable positioning and orientation of the vanes thereof) so as to generate the negative pressure applied to the air volume above the metal-working fluid and to drive the airflow through filter 11. Any suitable means for producing the air flow may be employed without departing from inventive concepts disclosed and/or claimed herein, including but not limited to: any suitable means for applying negative pressure to the air volume above the metal-working fluid; any suitable means for applying positive pressure to air inlets N, thereby driving air flow through the inlets N, the metal-working fluid, the de-mister, and the filter; combinations thereof; and/or functional equivalents thereof.

Figure 3:
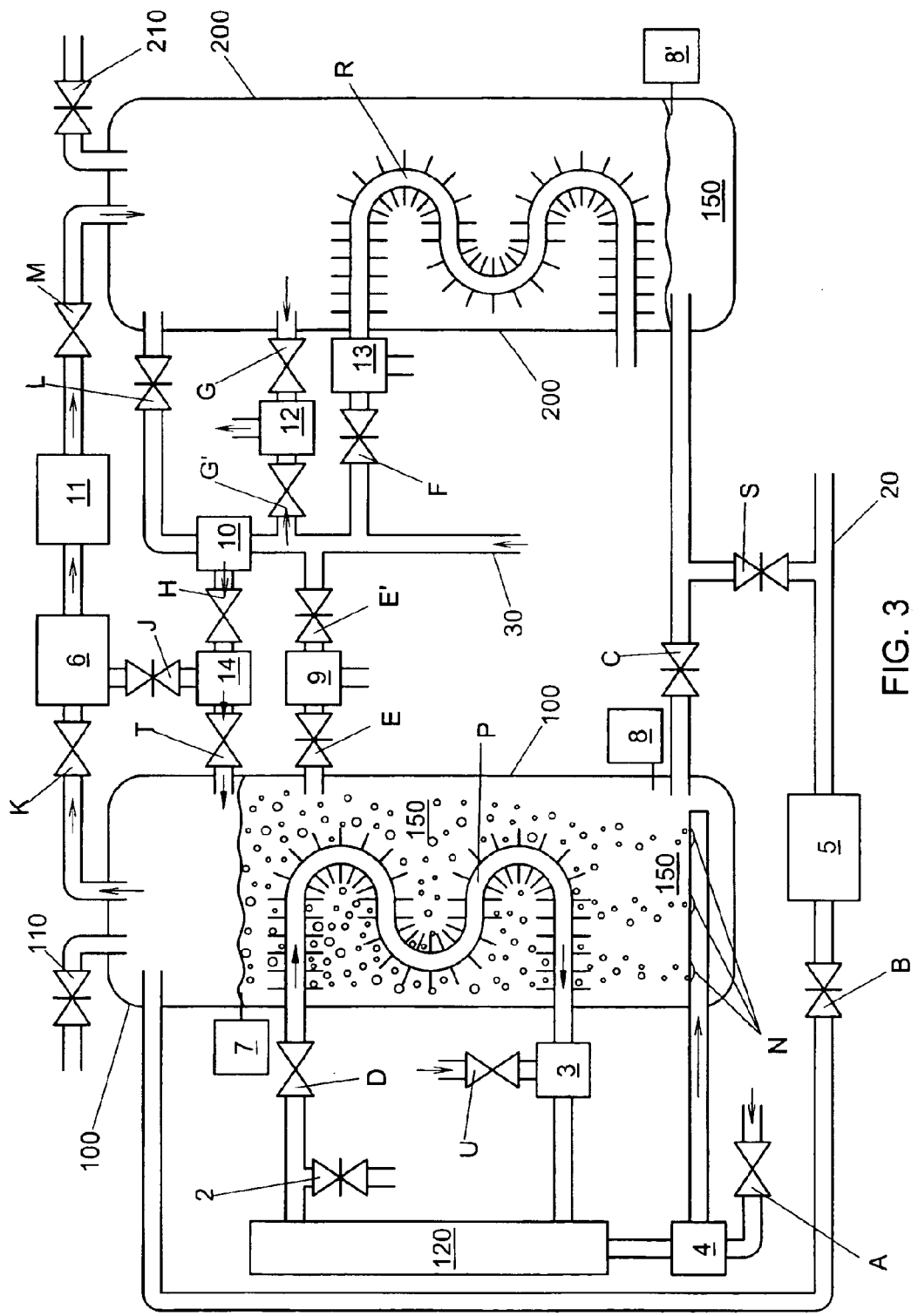
FIG. 3 schematically illustrates methods and apparatus for treating metal-working fluid according to the present invention.

In a preferred embodiment of the present invention, the collected droplets and/or mist from centrifuge impactor 6 flow through open valve J into reservoir 14. The reservoir is periodically drained and the collected metal-working fluid returned to the heating vessel by closing valve J and opening valves T and H, as shown in FIG. 3. Open valve H allows regulated shop compressed air (regulated to between about 1 psi and about 7 psi, preferably about 3 psi, above ambient atmospheric pressure) from regulator 10 to flow into reservoir 14 and drive the collected metal-working fluid through open valve T and back into heating vessel 100. After a suitable time interval for allowing reservoir 14 to substantially empty, valves T and H are closed and valve J reopens. This cycle repeats periodically during the heating period. Without departing from inventive concepts disclosed and or claimed herein, any suitable arrangement of reservoir, valves, and/or pumping means may be employed for returning fluid removed from the air flow to the heating vessel. In an alternative embodiment of the present invention, this collected fluid may not be returned to the heating vessel, but instead may be returned to the metal-working machine or otherwise disposed of.

Figure 4:
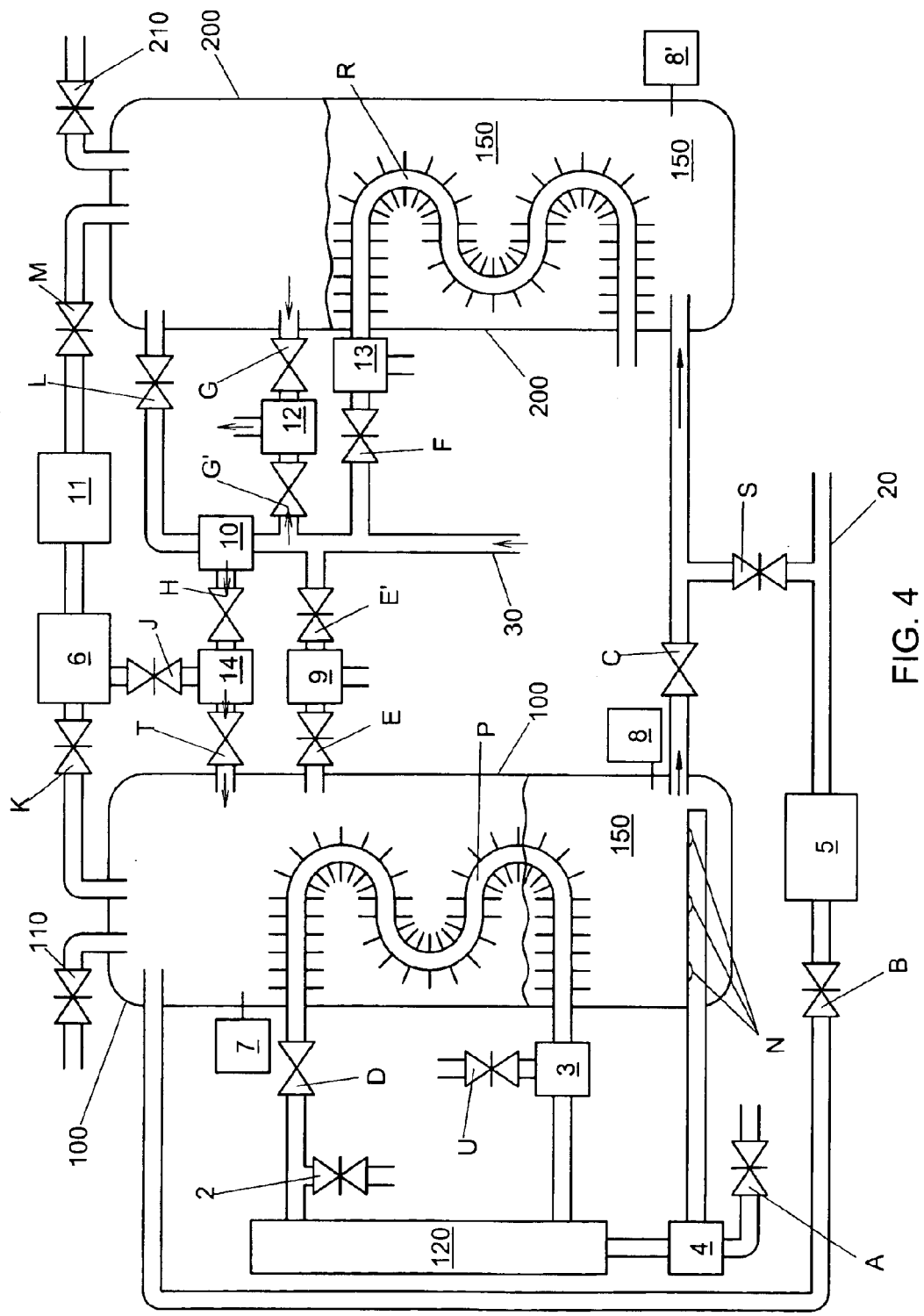
FIG. 4 schematically illustrates methods and apparatus for treating metal-working fluid according to the present invention.
Figure 5:
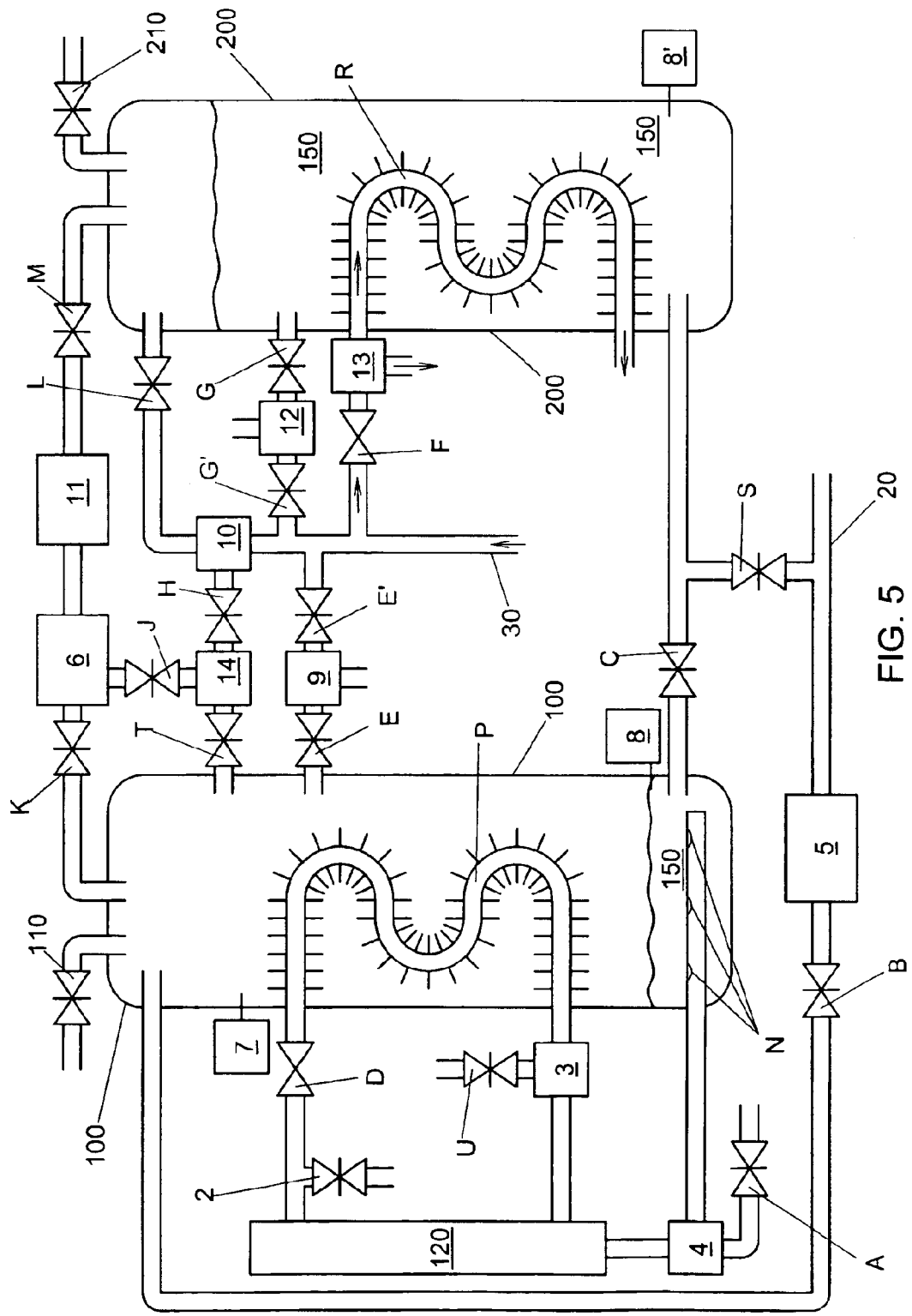
FIG. 5 schematically illustrates methods and apparatus for treating metal-working fluid according to the present invention.

After the desired heating period has been completed, the metal-working fluid 150 is transferred into holding vessel 200, as shown in FIG. 4. Valves B, E, and E' remain closed, valves U, A, J, K, and M close, valves T, H, and C open, and valves G and G' remain open. Metal-working fluid may flow from heating vessel 100 through open valve C and into holding vessel 200. The connections to the heating and holding tanks may preferably be located near the bottoms of each, thereby allowing gravity to assist the transfer of metal-working fluid in the initial stages. Positive pressure supplied by regulator 10 through open valves H and T assists the flow of metal-working fluid 150 but of heating vessel 100, while negative pressure applied by air flow amplifier 12 through open valve G (by compressed air supplied via open valve G') assists in drawing the metal-working fluid 150 into the holding tank. The transfer continues until a lowlevel limit switch 8 (or other suitable fluid level sensor) is tripped, or until the transfer is otherwise terminated (manually, by emptying the heating vessel, by filling the holding vessel, by tripping an upper fluid level limit switch or other level sensor in the holding vessel, or otherwise). Without departing from inventive concepts disclosed and/or claimed herein, any other suitable fluid transfer device may be employed for transferring the metal-working fluid from the heating vessel to the holding vessel. These may include but are not limited to: alternative devices for applying positive and/or negative air pressure to the vessels; a fluid pump of any suitable type for directly pumping the fluid from one vessel to the other; combinations thereof; functional equivalents thereof. The transfer may even be made manually, although this may prove hazardous with the metal-working fluid at an elevated temperature.

Once the transfer of metal-working fluid has terminated, valves C, G, G', H, and T close and valve F opens (FIG. 5), and the heated metal-working fluid is permitted to cool in holding vessel 200, preferably to near ambient temperature. Holding vessel 200 may be provided with safety pressure relief valve 210 in a manner analogous to relief valve 110 of heating vessel 100. The metal-working fluid may be allowed to passively cool, or in a preferred embodiment of the present invention, a heat exchanger R may be provided as a cooling element for holding tank 200 in a manner quite analogous to the heat exchanger provided for heating vessel 100. A preferred heat exchanger R comprises one or more fin tubes through which may flow a coolant, although many other suitable configurations for the heat exchanger may be equivalently employed without departing from inventive concepts disclosed and/or claimed herein. A preferred coolant is cold air provided by flow of shop compressed air through open valve F and through vortex tube 13. After passing through heat exchanger R the cold air may be vented to the surroundings. Vortex tubes are well-known sources of cold air and are disclosed in U.S. Pat. Nos. 1,952,281, 3,173,273, 3,208,229, 4,240,261, and 4,339,926. Each of these five patents is hereby incorporated by reference as if fully set forth herein. Without departing from inventive concepts disclosed and/or claimed herein, any suitable coolant or refrigerant, and any suitable means for cooling the same, may be employed without departing from inventive concepts disclosed and/or claimed herein. Examples include but are not limited to: use of a recirculating chiller employing a liquid chilling fluid; flow of cold tap water through the heat exchanger; a compressor-based refrigeration device; cryogenic coolants; freon-based and/or similar refrigerants;

combinations thereof; and/or functional equivalents thereof. The heat exchanger is preferably positioned within holding vessel 200, but may equivalently be provided on the exterior thereof. Alternatively, other methods for heat removal may be employed, such as thermo-electric cooling, or addition of cooling substances (ice, dry ice, or liquid nitrogen, for example) directly to the metal-working fluid.

Figure 6:
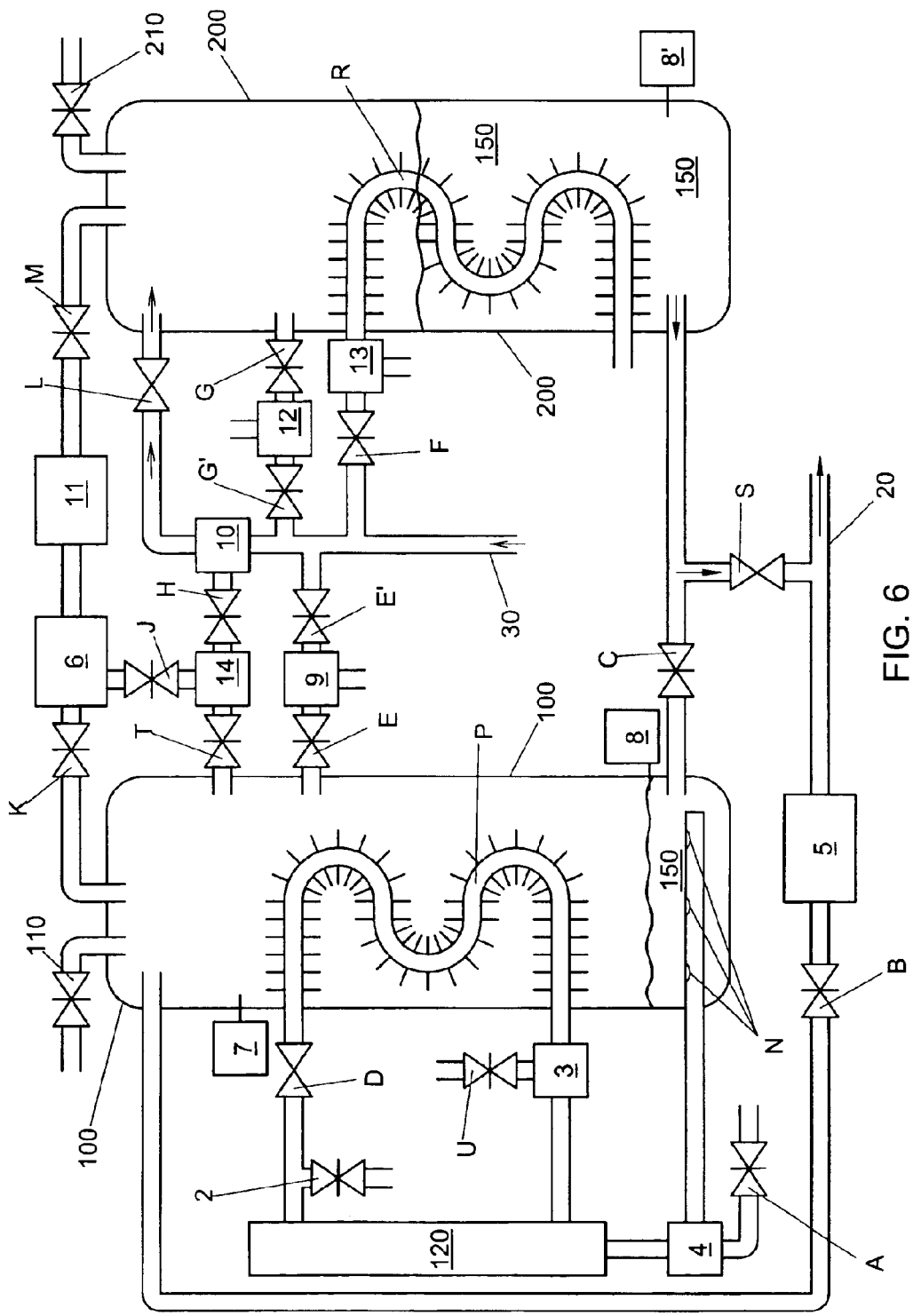
FIG. 6 schematically illustrates methods and apparatus for treating metal-working fluid according to the present invention.

Once the metal-working fluid has reached a suitably low temperature (preferably near ambient temperature) it may be transferred to the sump or reservoir of a metal-working machine as shown in FIG. 6. Valve F closes, and valves L and S open. Positive air pressure supplied by regulator 10 flows through open valve L into holding tank 200 and assists the flow of cooled metal-working fluid 150 out of holding vessel 200 through open valve S and transfer line 20. The transfer continues until terminated by closing valve S and/or valve L, either manually or otherwise (tripping a low fluid level limit switch 8' or other level sensor in the holding vessel, emptying the holding vessel, tripping an upper fluid level limit switch or other level sensor in the metal-working machine, filling the metal-working machine, and so forth). Without departing from inventive concepts disclosed and/or claimed herein, any other suitable fluid transfer means may be employed for transferring the metal-working fluid out of the holding vessel. These may include but are not limited to: alternative devices for applying positive air pressure to the holding vessel; a fluid pump of any suitable type for directly pumping the fluid out of the holding vessel; simple gravitational draining through a drain port; manual transfer; combinations thereof; functional equivalents thereof. While the entrance of metal-working fluid into the heating tank 100 and exit from holding vessel 200 are shown in the Figures flowing through the same transfer line 20, separate lines or passages may equivalently be employed without departing from inventive concepts disclosed and/or claimed herein.

Figure 8:
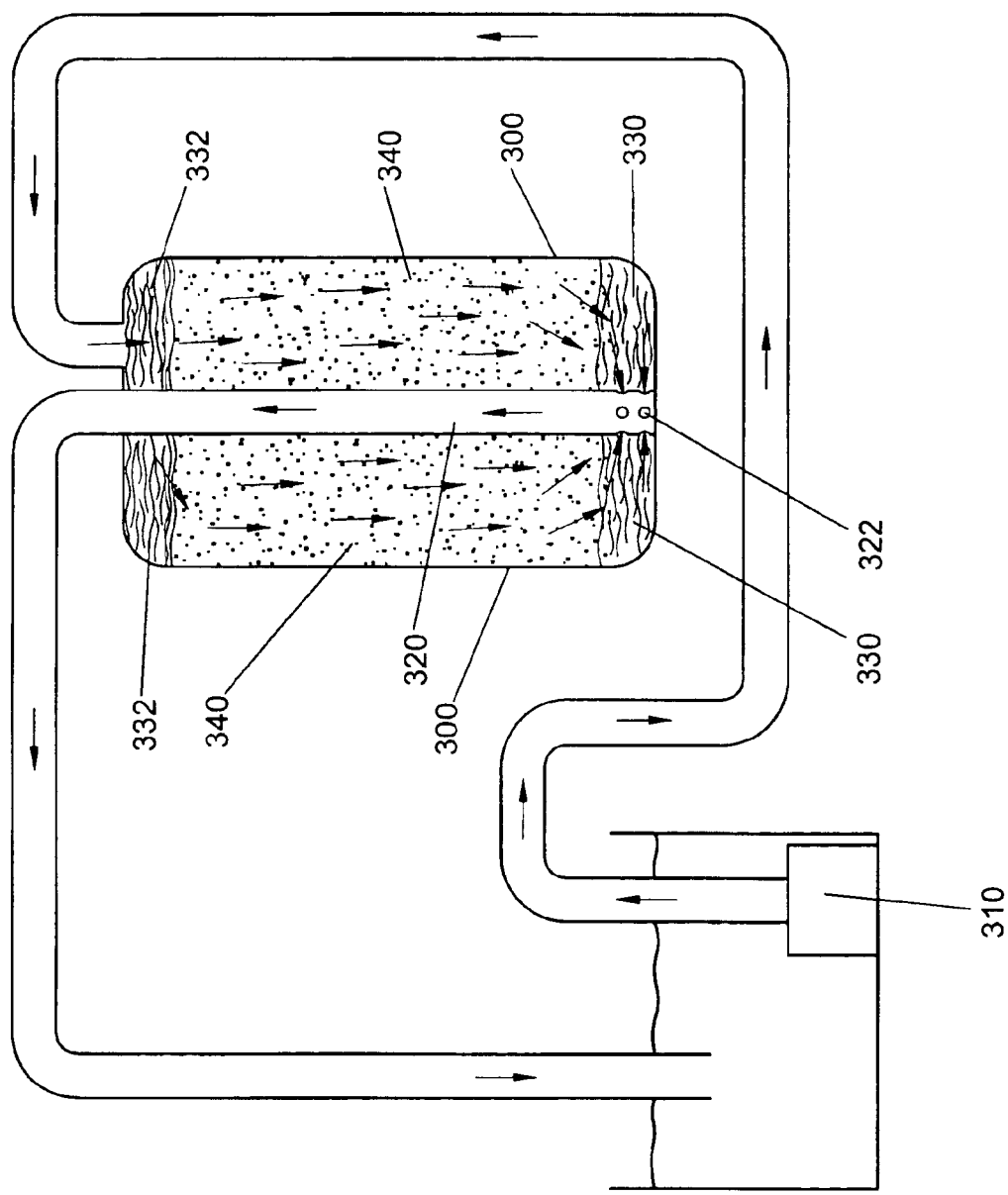
FIG. 8 shows a cross-section of an ion-exchange filter according to the present invention.

The apparatus may further include an ion-exchange filter as shown in FIG. 8. Metal-working fluid may be pumped from a reservoir into filter housing 300 using fluid pump 310. In a preferred embodiment, the metal-working fluid enters housing 300 and flows down through ion-exchange resin 340. Central tube 320 is provided with one or more openings 322 at its lower end for allowing flow of metal-working fluid therethrough. Fluid flows into tube 320 through openings 322, up through central tube 320, out of filter housing 300, and back into the reservoir. The upper and lower portions of the interior of filter housing 300 may be filled with an inert porous packing 332 and 330, respectively. The upper and lower inert packings serve to hold the ion exchange resin within the filter housing and prevent clogging/fouling of tube 320, openings 322, the pump, or other plumbing components connected to the filter. Alternative filter configurations may employed while remaining within the scope of inventive concepts disclosed and/or claimed herein. For example, in the filter of FIG. 8 the fluid may flow down through the central tube and up through the resin. In another example an in-line or column filter geometry may be employed wherein fluid enters one end of the housing and exits the other, without a central tube. The metal-working fluid may be continuously recirculated through the ion-exchange filter to achieve a desired reduction of concentrations of cobalt and/or other metals in the metal-working fluid. The required recirculation time depends on the volume of metal-working fluid to be treated, the initial cobalt/metal concentrations to be reduced, the desired cobalt/metal concentrations to be achieved, the flow rate of the metal-working fluid through the filter, and the properties of the particular ion-exchange resin employed. Some experimentation may be required to determine the appropriate recirculation time.

The ion-exchange resin preferably comprises polystyrene cross-linked with vinyl benzene which has been functionalized to include multiple sulfonate groups. This resin is readily available commercially, and typically takes the form of granules ranging in size from a few hundred microns to a few millimeters in size. Such resins are typically used in hydrogenated form (acidic) or as sodium salts (neutral or basic). Metal-working fluids are often used around pH 9 or 10, so the sodium form of the resin may be preferred. As metal-working fluid flows through the resin, cobalt or other metals to be removed are bound by the resin, which releases sodium ion in exchange. The capacity of the resin to absorb cobalt and/or other metal ions is therefore finite, and the resin must be periodically replaced. Without departing from inventive concepts disclosed and/or claimed herein, any functionally equivalent ion-exchange resin may be employed. Examples are disclosed in U.S. Pat. Nos. 4,871,779 and 5,545,798, said patents being hereby incorporated by reference as if fully set forth herein. Upper and lower packings 330 and 332 may preferably comprise a woven or mesh fiberglass packing material having a weave sufficiently dense to retain the resin granules. The weave or mesh may be regular or irregular. Other materials may be equivalently employed, such as glass wool, cloth or textile weave or mesh, paper-based packing, and so forth.

An ion-exchange filter may be used to treat metal-working fluid 150 from holding vessel 200. Fluid may be drawn from holding vessel 200, through the ion-exchange filter, and returned to holding vessel 200. Recirculation of the metal-working fluid from holding vessel 200 may take place before, during, and/or after cooling of the metal-working fluid, although treatment after cooling may be preferred. The appropriate recirculation time may be determined as described hereinabove. An immersion pump may be placed within holding vessel 200 for recirculating metal-working fluid through the ion-exchange filter, an air-flow amplifier may be employed as described hereinabove, or any other functionally equivalent pump may be employed. Alternatively, metal-working fluid from heating vessel 100 may be recirculated through the ion-exchange filter. Alternatively, the ion-exchange filter may be provided as a completely independent component for treating metal-working fluid, and the metal-working fluid may be recirculated through the ion-exchange filter from a sump of a metal-working machine or any other container or vessel.

In a preferred application of the present invention, the apparatus may be provided with a rolling base for allowing it to be readily moved around a machine shop. The apparatus may be moved to a metal-working machine with fluid needing treatment, and the filling/heating cycle begun. The apparatus may remain in place and the metal-working fluid returned after treatment to the metal-working machine from whence it came. A more efficient use of the apparatus would have the filling/heating cycle begin with already-treated metal-working fluid in a full holding vessel. After transferring the metal-working fluid (in need of treatment) from the metal-working machine into the heating vessel, the already-treated metal-working fluid may then be transferred to the metal-working machine. The metal-working machine therefore experiences minimal downtime due to treatment of the metal-working fluid. After the metal-working fluid has been treated, the apparatus may transfer metal-working fluid in need of treatment from a metal-working machine (the same machine or a different one) and promptly refill the machine with already-treated metal-working fluid from the holding vessel.

All aspects of the apparatus and methods disclosed and/or claimed herein may be under automated control, manual control, or some combination thereof. Level sensors, temperature sensors, pressure sensors, timers, and/or other monitoring gear may be monitored by a computer and/or other processor, and suitable commands generated and transmitted to the valves, pumps, and/or other devices as appropriate for the methods shown and described herein.

Methods and apparatus according to the present invention as disclosed and/or claimed herein may be applicable for treating other types of fluid. For example, methods and apparatus according to the present invention may be suitable for treating drinking water and/or other potable liquids. Additional treatment steps may be added, such as ozonation and/or UV irradiation, for example, to provide an enhanced level of treatment.

The present invention has been set forth in the forms of its preferred and alternative embodiments. It is nevertheless intended that modifications to the disclosed apparatus and methods for treating metal-working fluid may be made without departing from inventive concepts disclosed and/or claimed herein.

What is claimed is:

1. An apparatus for treating metal working fluid, comprising:

a heating vessel for receiving and holding metal-working fluid for treatment;

a heater for heating the metal-working fluid in the heating vessel;

an agitator for agitating the metal-working fluid within the heating vessel;

an aerator for aerating the metal-working fluid within the heating vessel;

a holding vessel for receiving and holding treated metal-working fluid from the heating vessel; and a de-mister, wherein:

the agitator and aerator comprise an air flow source and air inlets provided in a bottom portion of the heating vessel so that air flow through the inlets and through the metal-working fluid agitates and aerates the metal-working fluid; and the air flow through the metal-working fluid flows out of the heating vessel through the de-mister.

2. The apparatus of claim 1, wherein the de-mister comprises a centrifuge impactor.

3. An apparatus for treating metal working fluid, comprising:

a heating vessel for receiving and holding metal-working fluid for treatment;

a heater for heating the metal-working fluid in the heating vessel;

an agitator for agitating the metal-working fluid within the heating vessel;

an aerator for aerating the metal-working fluid within the heating vessel;

a holding vessel for receiving and holding treated metal-working fluid from the heating vessel; and an ion-exchange filter connected to the heating vessel or the holding vessel for reducing a concentration in the metal-working fluid of at least one metal.

4. The apparatus of claim 3, wherein one of the at least one metal is cobalt.

5. The apparatus of claim 3, wherein the ion-exchange filter includes a sulfonated divinyl-benzene-cross-linked polystyrene ion-exchange resin.

6. The apparatus of claim 3, wherein the ion exchange filter is connected to the holding vessel so as to enable recirculation of metal-working fluid from the holding vessel through the ion-exchange filter.

* * * * *